United States Patent [19]

Lonie

[11] Patent Number: 4,832,923
[45] Date of Patent: May 23, 1989

[54] LIQUID-LIQUID EXTRACTION COLUMNS

[75] Inventor: Susan J. Lonie, Newcastle-upon-Tyne, England

[73] Assignee: United Kingdom Atomic Energy Authority, London, England

[21] Appl. No.: 842,823

[22] Filed: Mar. 24, 1986

[30] Foreign Application Priority Data

Apr. 12, 1985 [GB] United Kingdom ............... 8509446

[51] Int. Cl.⁴ ............................................. B01D 11/04
[52] U.S. Cl. ..................................... 422/256; 422/257
[58] Field of Search ..................... 422/256, 257, 159

[56] References Cited

U.S. PATENT DOCUMENTS

| | | | |
|---|---|---|---|
| 2,011,186 | 8/1935 | Van Dijck . | |
| 2,153,507 | 4/1939 | Mann, Jr. | 422/256 |
| 2,191,919 | 2/1940 | Thayer . | |
| 2,759,872 | 8/1956 | Claridge et al. | 422/257 |
| 2,767,068 | 10/1956 | Maycock et al. | 422/256 |
| 3,108,859 | 10/1963 | Koski | 23/310 |

FOREIGN PATENT DOCUMENTS

| | | | |
|---|---|---|---|
| 520088 | 12/1955 | Canada | 422/257 |
| 116145 | 11/1975 | Fed. Rep. of Germany . | |
| 787057 | 12/1980 | U.S.S.R. | 422/257 |
| 886931 | 12/1981 | U.S.S.R. | 422/257 |
| 584876 | 2/1947 | United Kingdom . | |
| 1369669 | 10/1974 | United Kingdom . | |
| 233878 | 5/1975 | United Kingdom . | |

OTHER PUBLICATIONS

Long, Engineering for Nuclear Fuel Reprocessing, pp. 550–553, Gordon and Breach, New York, London, Paris, 1967.
Treybal, Liquid Extraction, 2nd Edition, pp. 462–472, McGraw-Hill Book Co., Inc., New York, San Francisco, Toronto, London, 1963.
Robert E. Treybal, Liquid Extraction, 2nd Edition, pp. 526–529 and 466–467.
Justin T. Long, Engineering for Neclear Fuel Reprocessing, p. 552.

Primary Examiner—Barry S. Richman
Assistant Examiner—William R. Johnson
Attorney, Agent, or Firm—William R. Hinds

[57] ABSTRACT

A liquid-liquid extraction column for use for example, in the solvent extraction of uranium and/or plutonium from an aqueous phase, comprises a perforated plate packing in which each plate (10) has flanges (18) associated with its perforations, which flanges (18) project upstream with respect to the disperse phase flow direction (arrows 14) so as to define a collecting zone (20) for disperse phase droplets (16) which thereby form a film or layer of the disperse phase component on the upstream face of each plate (10). In this way, droplet formation at the perforations of each plate (10) is not significantly influenced by variations of the wetting characteristics of the plate with time.

5 Claims, 3 Drawing Sheets

LIQUID-LIQUID EXTRACTION COLUMNS

BACKGROUND OF THE INVENTION

This invention relates to liquid-liquid extraction columns in which one liquid forms a continuous phase flowing in one direction along the column and the other liquid forms a disperse phase flowing in the opposite direction. The invention is particularly concerned with the type of column in which a packing comprising a series of spaced apart perforated plates is located within the column. One such column is a pulsed column and a typical application is in the solvent extraction of uranium and/or plutonium from an aqueous (nitric acid) phase using tributyl phosphate in odourless kerosene (TBP/OK) as solvent.

A major problem with such columns is the aging of the perforated plate packing over extended periods of operation. Plate aging leads to a drop in column efficiency as a result in variation in the wetting characteristics (contact angle) by the dispersed phase as a result of particles of grease and dirt for example adsorbing onto the plate surface.

FEATURES AND ASPECTS OF THE INVENTION

The object of the invention is to provide an effective solution to this problem.

Generally in accordance with the present invention, in a liquid-liquid extraction column with a perforated plate packing, at least one of said plates is arranged to trap a film or layer of the disperse phase component on that surface which is upstream with respect to the direction of flow of the disperse phase.

In practice, all of the perforated plates are preferably arranged to trap a disperse phase film or layer on their upstream surfaces. In this manner, the disperse phase droplets approaching the plates are confronted by a disperse phase film or layer with substantially constant wetting characteristics and do not therefore contact the plate surface. Consequently variations in the wetting characteristics of the plate surfaces have little or no influence on droplet size as the disperse phase emerges at the downstream faces of the plates.

In one embodiment of the invention the plates may each be in the form of a nozzle plate in which each of the perforations is provided with a nozzle-forming portion projecting from one face of the plate. Such nozzle plates are well known in the liquid-liquid extraction column art and are normally arranged so that the nozzle is directed in the downstream direction with respect to the disperse phase flow direction - see, for example, the text books "Liquid Extraction" by Robert E Treybal (Page 467) and "Engineering for Nuclear Fuel Processing" by Justin T Long (Page 552). Conventionally the nozzles are intended to reduce the effect of plate wetting by the disperse phase on droplet formation downstream of the plate. In contrast with conventional practice however, the nozzle plates as used in the invention are arranged with the nozzles pointing upstream with respect to the disperse phase flow. When used in this manner, the nozzles serve to define a collecting zone at the upstream face of the plate, which zone collects sufficient disperse phase to create said film or layer.

In conventional nozzle plates, the nozzles may each be defined by an inclined annular flange (eg. of frusto-conical configuration). This type of nozzle plate may be used in columns constructed in accordance with the invention (but with the nozzles pointing upstream with respect to the disperse phase flow); however, the annular flanges may, alternatively, project substantially perpendicularly to the plate surface.

If desired, the nozzles may be so arranged that they include both upstream and downstream portions. If the upstream nozzle portions are substantially perpendicular to the plates, the downstream portions may be inclined or substantially perpendicular.

In accordance with the invention, in a pulsed liquid-liquid extraction column in which one liquid forms a continuous phase which undergoes bulk flow in one direction along a longitudinal axis of the column and the other liquid forms a dispersed phase which undergoes bulk flow in the opposite direction and remains dispersed in the continuous phase during its travel along the length of the column, and in which the column includes an inlet for said one liquid and an outlet for said other liquid which are both located proximate to a first end of the column, with said inlet for said one liquid being connected to a source of said one liquid, and an outlet for said one liquid and an inlet for said other liquid which are both located proximate to a second, opposite end of the column, with said inlet for said other liquid being connected to a source of said other liquid, the column further containing a series of plates spaced apart along said longitudinal axis and interposed transversely in the flow paths of said continuous and dispersed phases to separate the column into successive axial zones, each plate being provided with a plurality of perforations each bordered on one face of the plate by an axially-projecting annular flange to form a nozzle having a drop-formation-controlling orifice defined by the free edge of said flange and through which orifice unimpeded flow of said liquids takes place between those zones of the column separated by each plate, all of the nozzles of all of said plates projecting in the same direction axially of the column, there is provided the improvement wherein each of said plates is arranged with its nozzles projecting toward said second end and hence in the upstream direction with respect to bulk flow of said dispersed phase whereby a film of the dispersed phase accumulates at the face of each of said plates which faces said second end over the area of the face which is uninterrupted by said nozzles.

Also in accordance with the invention, in a pulsed liquid-liquid extraction column in which one liquid forms a continuous phase which undergoes bulk flow in one direction along a longitudinal axis of the column and the other liquid forms a dispersed phase which undergoes bulk flow in the opposite direction and remains dispersed in the continuous phase during its travel along the length of the column, and in which the column includes an inlet for said one liquid and an outlet for said other liquid which are both located proximate to a first end of the column, with said inlet for said one liquid being connected to a source of said one liquid, and an outlet for said one liquid and an inlet for said other liquid which are both located proximate to a second, opposite, end of the column, with said inlet for said other liquid being connected to a source of said other liquid, the column further containing a series of plates spaced apart along said longitudinal axis and interposed transversely in the flow paths of said continuous and dispersed phases to separate the column into successive axial zones, each plate being provided with a plurality of perforations each bordered on one face of the plate by an axially-projecting annular flange to define a first nozzle having a drop formation-controlling orifice defined by the free edge of said flange and through which orifice unimpeded flow of said liquids takes place between those zones of the column separated by each plate, all of the first nozzles of all of said plates projecting in the direction toward said first end and hence, downstream with respect to bulk flow of said dispersed phase, there is provided the improvement wherein each of said perforations is additionally bordered on the opposite face of the respective plate by a further axially-projecting flange to form at said opposite face of the plate a second nozzle through which unimpeded flow of said liquids takes place between those zones of the column separated by the respective plate and which projects in the direction toward said second end and hence, upstream with respect to bulk flow of said dispersed phase whereby a film of the dispersed phase accumulates at the face of each of said plates which faces said second end over the area of the face which is uninterrupted by said further nozzles.

DESCRIPTION OF THE DRAWINGS

To promote further understanding of the invention, embodiments will now be described by way of example with reference to the accompanying drawings, in which.

DESCRIPTION OF PREFERRED EMBODIMENTS

Figure 1:
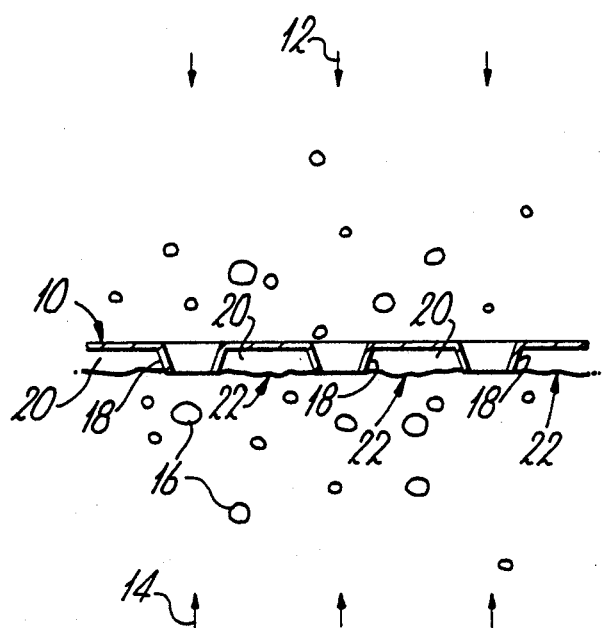
FIG. 1 illustrates diagrammatically the arrangement of a nozzle plate with respect to the disperse and continuous phase flows within a pulsed column.
Figure 4:
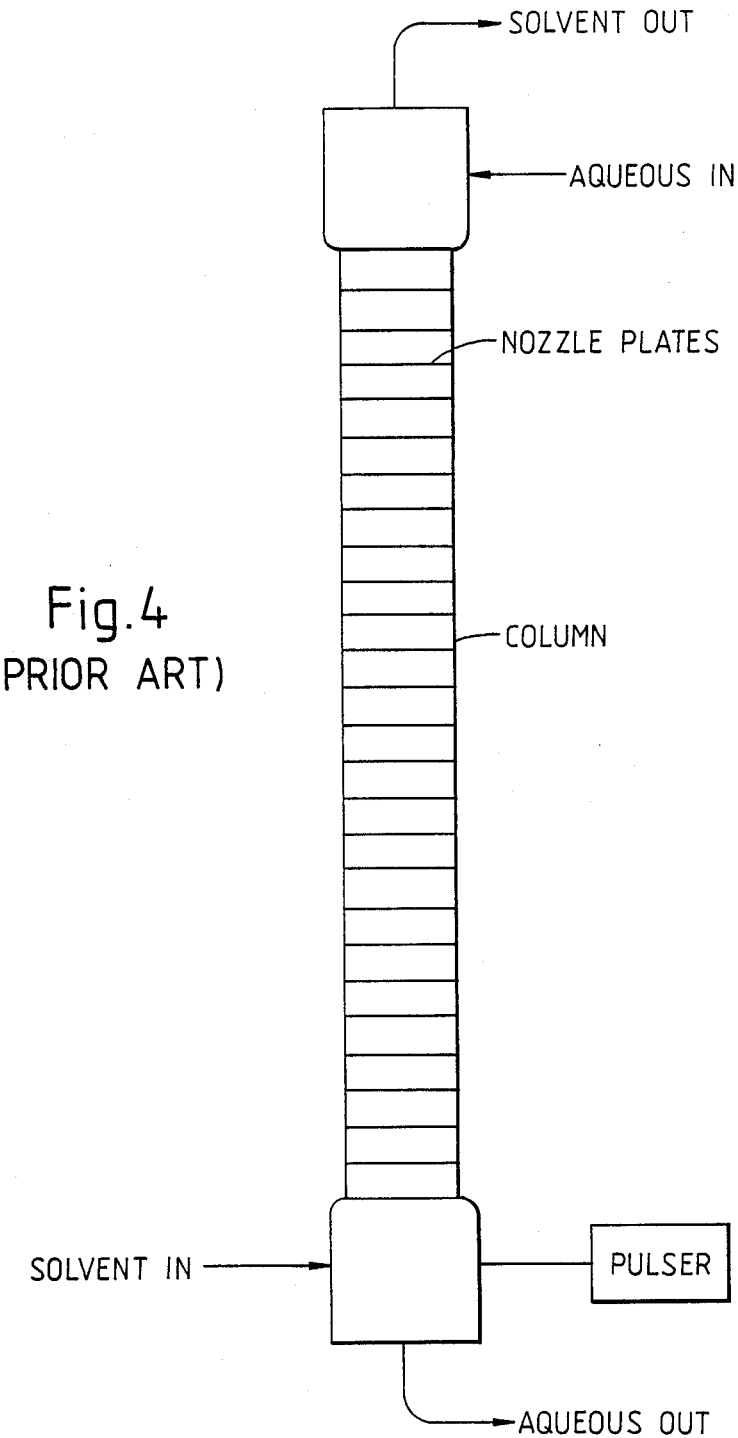
FIG. 4 is a diagrammatic illustration of a typical pulsed column of the type to which the invention relates.

A typical application of the invention is in the use of a pulsed column, with perforated plate packing, as diagrammatically illustrated in FIG. 4, for the extraction of uranium and/or plutonium solute from an aqueous nitric acid solution with the aid of TBP/OK solvent. FIG. 1 illustrates diagrammatically part of one plate 10 as used in an extraction column according to the invention. In FIG. 1, the aqueous solution forms the continuous phase and its direction of flow is downward as indicated by arrows 12. The TBP/OK solvent forms the disperse phase which flows upwards as indicated by arrows 14. Droplets of the disperse phase are depicted by reference numeral 16. The plate 10 comprises a nozzle plate having nozzles defined by annular flanges 18 which, in this embodiment, are inclined with respect to the plane of the plate so as to form nozzles of frusto-conical configuration.

It will be noted that, in contrast with conventional practice, the nozzles defined by annular flanges 18 point in the upstream direction with respect to the disperse phase flow direction 14. The flanges 18 thereby define collecting zones 20 in which the disperse phase can collect so as to create around each nozzle a film or layer 22 of the disperse phase which in effect, isolates the droplets 16 (other than those initially forming the film or layer) from impinging directly against the surface of the plate 10. In this way, downstream droplet formation occuring in the region of the nozzles is influenced primarily by the film or layer 22 rather than the upstream surface of the plate and can therefore remain consistent despite changes in the wetting characteristics of the plate. In other words, the upstream face of each plate is always wetted by the disperse phase during operation of the column.

In the embodiment of FIG. 1, the annular flanges 18 have a frusto-conical configuration but they may alternatively be substantially perpendicular to the plates 10, ie. so that they have a substantially cylindrical configuration. In both cases, droplet formation at the plate perforations will in effect be governed by the narrow upstream edges of the flanges and because of the presence of the disperse phase film around these edges, there will be no significant tendency for the droplets to adhere to the upstream plate faces beyond the edges.

Figure 2:
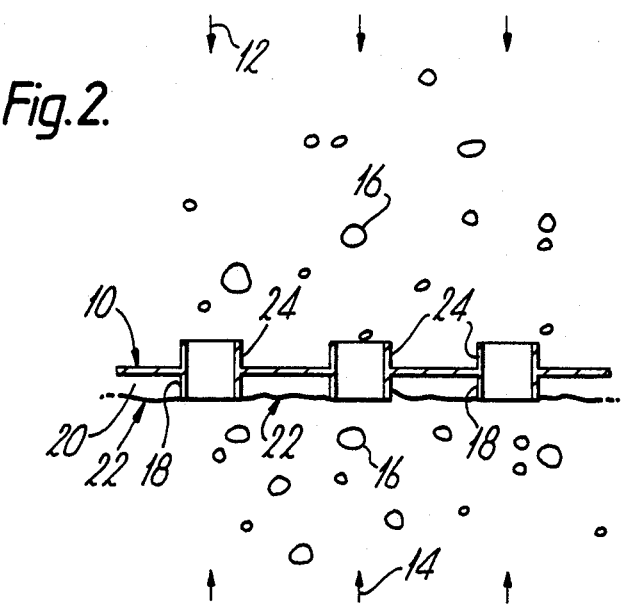
FIG. 2 is a similar view to that of FIG. 1 in which a modified form of nozzle plate is employed.

FIG. 2 illustrates the use of cylindrical upstream flanges 18. In addition, each plate perforation has downstream nozzles defined by flanges 24 associated to provide further control over droplet formation at the perforations. In FIG. 2, the upstream nozzle flanges 18 and the downstream nozzle flanges 24 are shown cylindrical; they may however both be of frusto-conical configuration or one set of nozzle flanges may be cylindrical and the other frusto-conical.

Figure 3:
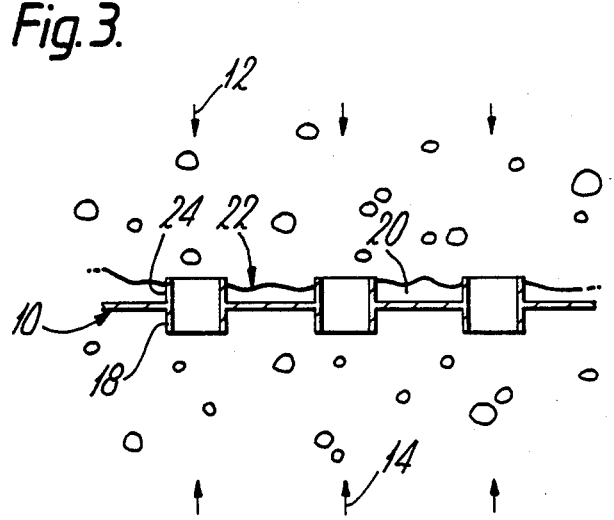
FIG. 3 is a similar view to that of FIG. 2 but showing the disperse phase flowing downwardly.

The double nozzle arrangement of FIG. 2 enables the column to be used to achieve the advantages of the invention irrespective of the flow direction of the disperse phase. Thus, as shown in FIG. 3, the column is shown operational with the aqueous phase dispersed, ie. aqueous phase droplets, flowing in the downward direction (arrows 12) and the solvent in the continuous phase flowing upwardly (arrows 14). In this case, the aqueous phase droplets form a film or layer on the upper face of the plates 10, ie. the upstream face with respect to disperse phase flow.

I claim:

1. In a pulsed liquid-liquid extraction column in which one liquid forms a continuous phase which undergoes bulk flow in one direction along a longitudinal axis of the column and the other liquid forms a dispersed phase which undergoes bulk flow in the opposite direction and remains dispersed in the continuous phase during its travel along the length of the column, and in which the column includes an inlet for said one liquid and an outlet for said other liquid which are both located proximate to a first end of the column, with said inlet for said one liquid being connected to a source of said one liquid, and an outlet for said one liquid and an inlet for said other liquid which are both located proximate to a second, opposite, end of the column, with said inlet for said other liquid being connected to a source of said other liquid, the column futher containing a series of plates spaced apart along said longitudinal axis and interposed transversely in the flow paths of said continuous and dispersed phases to separate the column into successive axial zones, each plate being provided with a plurality of perforations each bordered on one face of the plate by an axially-projecting annular flange to form a nozzle having a drop formation-controlling orifice defined by the free edge of said flange and through which orifice unimpeded flow of said liquids takes place between those zones of the column separated by each plate, all of the nozzles of all of said plates projecting in the same direction axially of the column, the improvement wherein each of said plates is arranged with its nozzles projecting towards said second end and hence in the upstream direction with respect to bulk flow of said dispersed phase whereby a film of the dispersed phase accumulates at the face of each of said plates which faces said second end, over the area of the face which is uninterrupted by said nozzles.

2. A pulsed liquid-liquid extraction column as claimed in claim 1 in which each said annular flange is of frusto-conical configuration and decreases in cross-section in a direction towards said second end.

3. A pulsed liquid-liquid extraction column as claimed in claim 1 in which each said annular flange is of substantially cylindrical configuration.

4. In a pulsed liquid-liquid extraction column in which one liquid forms a continuous phase which undergoes bulk flow in one direction along a longitudinal axis of the column and the other liquid forms a dispersed phase which undergoes bulk flow in the opposite direction and remains dispersed in the continuous phase during its travel along the length of the column, and in which the column includes an inlet for said one liquid and an outlet for said other liquid which are both located proximate to a first end of the column, with said inlet for said one liquid being connected to a source of said one liquid, and an outlet for said one liquid and an inlet for said other liquid which are both located proximate to a second, opposite, end of the column, with said inlet for said other liquid being connected to a source of said other liquid, the column futher containing a series of plates spaced apart along said longitudinal axis and interposed transversely in the flow paths of said continuous and dispersed phases to separate the column into successive axial zones, each plate being provided with a plurality of perforations each bordered on one face of the plate by an axially-projecting annular flange to define a first nozzle having a drop formation-controlling orifice defined by the free edge of said flange and through which orifice unimpeded flow of said liquids takes place between those zones of the column separated by each plate, all of the nozzles of all of said plates projecting in the direction towards said first end and hence, downstream with respect to bulk flow of said dispersed phase, the improvement wherein each of said perforations in additionally bordered on the opposite face of the respective plate by a further axially-projecting flange to form at said opposite face of the plate a second nozzle through which unimpeded flow of said liquids takes place between those zones of the column separated by the respective plate and which projects in the direction towards said second end and hence, upstream with respect to bulk flow of said dispersed phase whereby a film of the dispersed phase accumulates at the face of each of said plates which faces said second end, over the area of the face which is uninterrupted by said further nozzles.

5. A pulsed liquid-liquid extraction column as claimed in claim 4 in which said annular flanges defining both the first and second nozzles are of substantially cylindrical configuration.

* * * * *